United States Patent
Frank et al.

(10) Patent No.: US 8,957,385 B2
(45) Date of Patent: Feb. 17, 2015

(54) RADIATION DETECTION SYSTEM, A RADIATION SENSING UNIT, AND METHODS OF USING THE SAME

(75) Inventors: John M. Frank, Hartville, OH (US); Artan Duraj, Seven Hills, OH (US)

(73) Assignee: Saint-Gobain Ceramics & Plastics, Inc., Worcester, MA (US)

(*) Notice: Subject to any disclaimer, the term of this patent is extended or adjusted under 35 U.S.C. 154(b) by 331 days.

(21) Appl. No.: 13/306,682

(22) Filed: Nov. 29, 2011

(65) Prior Publication Data

US 2012/0132815 A1  May 31, 2012

Related U.S. Application Data

(60) Provisional application No. 61/417,767, filed on Nov. 29, 2010.

(51) Int. Cl.
   *G01T 1/20* (2006.01)
   *G01T 7/00* (2006.01)

(52) U.S. Cl.
   CPC .. *G01T 1/20* (2013.01); *G01T 7/005* (2013.01)
   USPC ..................................................... 250/362

(58) Field of Classification Search
   USPC ..................................................... 250/362
   See application file for complete search history.

(56) References Cited

U.S. PATENT DOCUMENTS

| | | | |
|---|---|---|---|
| 3,465,157 A | 9/1969 | Martens | |
| 3,560,755 A | 2/1971 | Blaise et al. | |
| 4,220,851 A | 9/1980 | Whatley, Jr. | |
| 4,272,677 A | 6/1981 | Berthold et al. | |
| 4,346,590 A | 8/1982 | Brown | |
| 4,438,348 A | 3/1984 | Casper et al. | |
| 5,367,222 A | 11/1994 | Binkley | |
| 5,376,797 A | 12/1994 | Persyk et al. | |
| 5,525,794 A * | 6/1996 | Gibbons | 250/207 |
| 5,548,112 A | 8/1996 | Nakase et al. | |
| 6,087,656 A * | 7/2000 | Kimmich et al. | 250/252.1 |
| 6,657,385 B2 | 12/2003 | Tomasetti et al. | |
| 7,005,646 B1 | 2/2006 | Jordanov et al. | |
| 7,049,598 B1 | 5/2006 | Jordanov et al. | |
| 7,155,133 B2 | 12/2006 | Stewart et al. | |
| 7,157,681 B1 * | 1/2007 | Tetzlaff | 250/207 |
| 7,202,456 B2 | 4/2007 | Mickael | |
| 7,274,013 B1 | 9/2007 | Russ et al. | |
| 7,671,539 B1 | 3/2010 | Mentzer et al. | |
| 2008/0087068 A1 | 4/2008 | Roth et al. | |

* cited by examiner

*Primary Examiner* — Christine Sung
(74) *Attorney, Agent, or Firm* — Abel Law Group, LLP; Robert N. Young

(57) ABSTRACT

A radiation sensing unit for a radiation detection system can include a scintillator and a photosensor optically coupled to the scintillator. In an embodiment, the radiation detection system may provide an output signal to a particular radiation flux that is substantially temperature independent over a normal operating temperature range for the scintillator. The radiation sensing unit may further include a controllable radiation source configured to emit radiation and another photosensor coupled to controllable radiation source. A radiation detection system can include a radiation sensing unit and a control module that is coupled to the controllable radiation source and the photosensors. The control module may control the controllable radiation source and control a power supply coupled to the second photosensor in response to signals from the photosensors. In another aspect, a dynode tap from a photomultiplier tube can be used during calibration. Methods of using the foregoing are disclosed.

20 Claims, 2 Drawing Sheets

RADIATION DETECTION SYSTEM, A RADIATION SENSING UNIT, AND METHODS OF USING THE SAME

CROSS-REFERENCE TO RELATED APPLICATION

This application claims priority under 35 U.S.C. §119(e) to U.S. Patent Application No. 61/417,767 entitled "Radiation Detection System, a Radiation Sensing Unit, and Methods of Using the Same," by Frank et al., filed Nov. 29, 2010, which is assigned to the current assignee hereof and incorporated herein by reference in its entirety.

FIELD OF THE DISCLOSURE

The present disclosure is directed to radiation detection systems and radiation sensing units and methods of using such radiation detection systems and radiation sensing units.

BACKGROUND

Radiation detection systems are used in a variety of applications. For example, radiation detector systems can include scintillators that can be used for imaging applications, such as a medical diagnostic apparatus, a security screening apparatus, well logging, military applications, or the like. Further improvement of radiation detection systems is desired.

BRIEF DESCRIPTION OF THE DRAWINGS

Embodiments are illustrated by way of example and are not limited in the accompanying figures.

Figure 1:
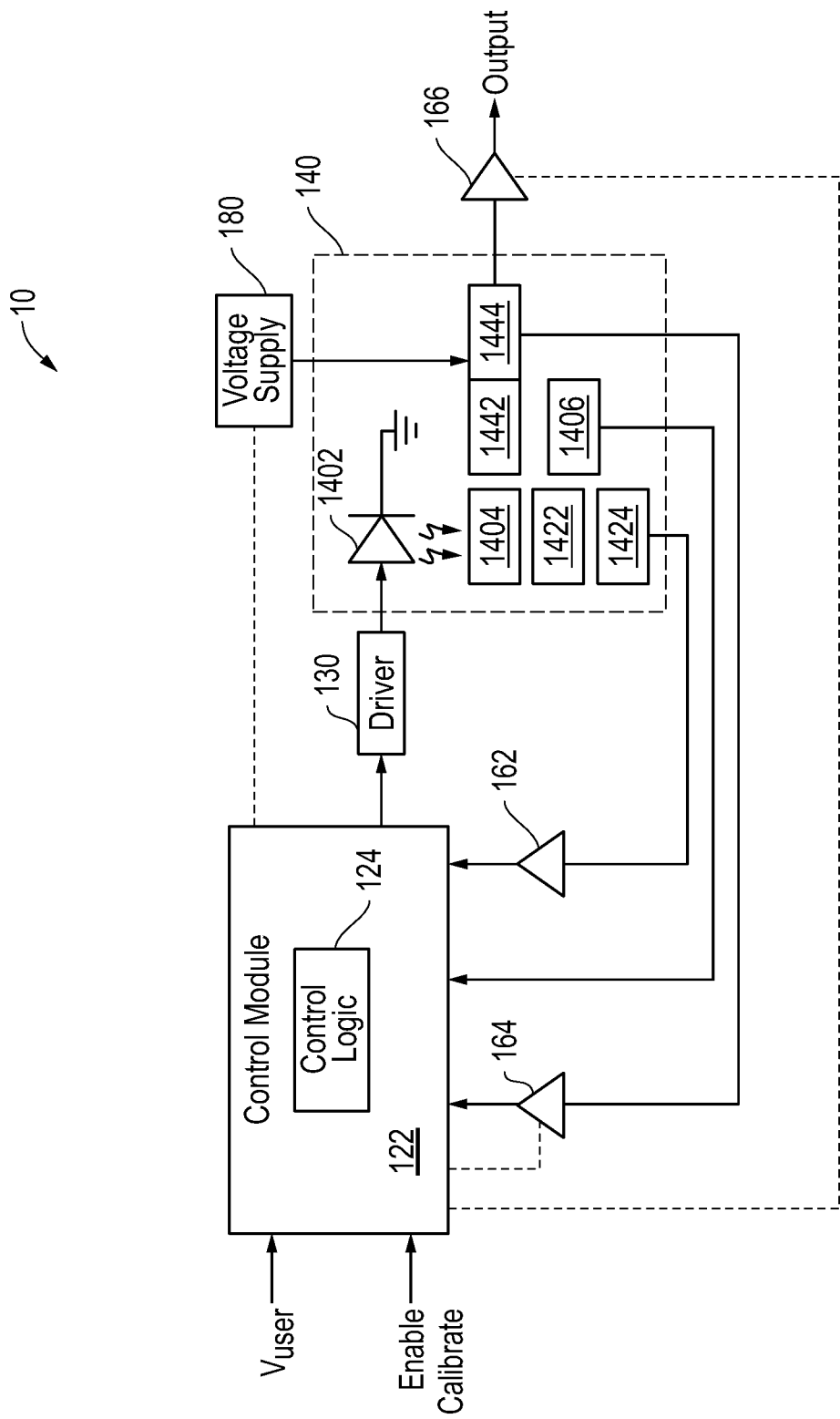
FIG. 1 includes a depiction of a radiation detection system in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the term "normal operating temperature range" is intended to mean a temperature over which a radiation detection system, or a portion thereof, is specified or designed to operate. For example, a normal operating temperature range can be explicitly specified. In another example, the application of the radiation detection system may be used to determine a normal operating temperature range. If a radiation detection system is to be used outdoors at ports of entry into a country, the normal temperature range may be −40° C. to +50° C. If the radiation detection system is to used for well logging, the normal operating temperature range may be the range of temperatures typically experienced within a well bore when well logging.

The terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

A radiation detection system can provide an output in response to a radiation flux, wherein the output is substantially temperature insensitive over the normal operating temperature range for radiation detection system. More particular, the radiation detection system can take into account variations in light output of a scintillator and variations in quantum efficiency of a photosensor as the temperature to which the scintillator and photosensor are exposed changes. Thus, the radiation detection system has a significant improvement over conventional radiation detection systems which do not account for temperature variation of the scintillator. In a particular embodiment, the radiation detection system does not have a temperature sensor adjacent to the scintillator or the photosensor. Many conventional radiation detection systems do not adjust for a temperature change, or if they adjust for a temperature change, such systems have a temperature sensor near a photosensor. Particular non-limiting configurations for the improved radiation detection system are illustrated and described in more detail below.

FIG. 1 illustrates an embodiment of a radiation detection system 10. The radiation detection system can be a medical imaging apparatus, a well logging apparatus, a security inspection apparatus, for military applications, or the like. The radiation detection system 10 can include a control module 122, a driver 130, a radiation sensing unit 140 (illustrated by a dashed-line enclosure in FIG. 1), amplifiers 162, 164, and 166, and a voltage supply 180.

The control module 122 can include control logic 124 that can be used during the operation of the radiation detection system 10, and in particular, for calibrating the radiation detection system 10. The control logic 124 can be in hardware, software, firmware, or a combination thereof. In a particular embodiment the control logic 124 can be in the form of circuits within an integrated circuit or on a printed circuit board; a combination of a processor and a tangible, non-transitory processor-readable medium having code embedded therein that includes instructions, which when executed by the processor causes the processor to perform actions corresponding to the instructions; a field programmable gate array ("FPGA"), another suitable means for controlling the calibration of the radiation detection system 10, or any combination thereof. The control module 122 can include an input to receive a voltage from a user and another input to receive a calibrate enable signal. In the embodiment as illustrated in FIG. 1, the control module 122 is electrically coupled to a driver 130, which can be a circuit, such as an amplifier. The driver 130 is electrically coupled to and provides a sufficiently strong signal to drive a controllable radiation source 1402 within the radiation sensing unit 140.

The radiation sensing unit 140 may be a subassembly that can be sold or imported separately from the rest of the radiation detection system 10. The radiation sensing unit 140 and the remaining parts of the radiation detection system 10 may be located and used within the same building, or more particularly, in adjacent rooms or the same room. In another embodiment, the radiation sensing unit 140 may be used remotely to the remaining parts of the radiation detection system 10. For example, the radiation sensing unit 140 may be used in a well bore during well logging during a drilling operation.

The controllable radiation source 1402 can produce radiation having an electromagnetic radiation spectrum, to which a photosensor 1424 and a scintillator 1442 are responsive. In a particular embodiment, the controllable radiation source 1402 can include a light emitting diode ("LED") that emits ultraviolet ("UV") radiation when activated. In another embodiment, a different radiation source may be used that emits different radiation having a different electromagnetic radiation spectrum. The controllable radiation source 1402 is coupled to the photosensor 1424 and the scintillator 1442.

An optical piece 1404 may be disposed along a radiation path between the controllable radiation source 1402 and each of the photosensor 1424 and the scintillator 1442. In a particular embodiment, the optical piece 1404 can include a transparent window, a beam splitter, another suitable component capable of directing radiation towards the photosensor 1424 and the scintillator 1442, or any combination thereof.

The photosensor 1424 is electrically coupled to the control module 122. The photosensor 1424 produces electrons upon receiving radiation for which the photosensor 1424 is responsive. The photosensor 1424 can generate a signal that is sent to the control module 122. If needed or desired, the amplifier 162 or another component may be used to amplify, condition, or convert the signal into a form useful to the control module 122. In a particular embodiment, the photosensor 1424 can include a photodiode.

FIG. 1 illustrates a wavelength shifting material 1422 along the radiation path between the controllable radiation source 1402 and the photosensor 1424. If the controllable radiation source 1402 includes a UV LED and the photosensor 1424 is significantly responsive to UV radiation, the wavelength shifting material 1422 may be omitted. However, another factor may affect the decision on whether a wavelength shifting material 1424 is used. For example, the radiation detection system 10 may be designed to use a photosensor having a quantum efficiency that changes linearly with temperature, hereinafter referred to as "linear temperature response." The output of such a photosensor may be used to determine the temperature of the radiation sensing unit 140 without the need for a temperature sensor. The photosensor 1424 can effectively replace a temperature sensor if it has a linear temperature response. However, when the photosensor 1424 is linear temperature responsive, it may not be significantly responsive to radiation that is emitted from the controllable radiation source 1402. The wavelength shifting material 1422 may be used to shift the radiation emitted from the controllable radiation source 1402 to radiation of a wavelength for which the photosensor 1424 is responsive. The wavelength shifting material 1422 can be disposed along the radiation path between the optical piece 1404 and the photosensor 1424. In an embodiment, the controllable radiation source 1402 can include a UV LED, and the photosensor 1424 may be responsive to radiation other than UV radiation. More particularly, the photosensor 1424 may be responsive to blue or green light. The wavelength shifting material 1422 can increase the wavelength so that the UV radiation is shifted to blue or green light.

The use of the wavelength shifting material 1422 may be determined by another factor. For example, photosensors that are responsive to radiation emitted by the controllable radiation source 1402 may be expensive, have a relatively short useful life, have a low signal-to-noise ratio, or the like. The wavelength shifting material 1422 may be used to allow a wider array of photosensors to be used, even if those photosensors do not have a linear temperature response. If the photosensor 1424 does not have a linear temperature response, the control module 122 may include a look-up table that correlates temperature readings from the temperature sensor 1406 to a corresponding quantum efficiency of the photosensor 1424.

Radiation from the controllable radiation source 1402 is also received by the scintillator 1442. The scintillator 1442 can produce radiation, such as scintillating light, when the scintillator 1442 captures radiation from the controllable radiation source 1402. The radiation from the scintillator 1442 has a different electromagnetic radiation spectrum than the electromagnetic radiation spectrum of the radiation produced by the controllable radiation source 1402. In a particular embodiment, the electromagnetic radiation spectrum produced by the scintillator 1442 produces radiation having an emission maximum different from an emission maximum of the electromagnetic radiation spectrum produced by the controllable radiation source 1402. The scintillator 1442 can include a rare earth or other metal halide; a rare earth sulfide, oxysulfide, germinate, silicate, or aluminum garnet; a $CdWO_4$, a $CaWO_4$, a ZnS, a ZnO, a ZnCdS; or any combination thereof. A single dopant or combination of dopants may be used to provide or modify a particular property of the scintillator 1442, such as wavelength of scintillating light, intensity of the scintillating light, afterglow, another suitable scintillating property, or any combination thereof. In a particular set of embodiments, the scintillator 1442 can include a NaI, a CsI, a CsI, BGO, $SrI_2$, $LaBr_3$, an LYSO, an LSO, a $Cs_2LiYCl_6$, or any combination thereof.

A photosensor 1444 is optically coupled to the scintillator 1442 and is electrically coupled to the voltage supply 180 and the control module 122. The scintillator 1442 can produce scintillating light that is received by the photosensor 1444, and the photosensor can generate signals that are sent to an amplifier 164 and an output. In an embodiment, the photosensor 1444 may not significantly respond to radiation emitted by the controllable radiation source 1402. In another embodiment, the photosensor 1444 can include a photomultiplier, and in a more particular embodiment, a photomultiplier tube or a semiconductor-based photomultiplier. The voltage supply 180 can be coupled to an anode or a cathode of the photosensor 1444, and the anode can be an output that is provided to the user. If needed or desired, an amplifier 166 can be used to amplify the signal from the anode of the photosensor 1444, and the amplified signal can be provided to the output for the user. The control module 122 can provide a control signal to the amplifier 166 to adjust the gain of the amplifier 166. In another embodiment, the amplifier 166 may be omitted, and the unamplified signal from the anode may be provided to the output of the radiation detection system 10.

When the photosensor 1444 includes stages, an intermediate stage may be used to provide a signal that is sent to the amplifier 164. When the photosensor 1444 includes a photomultiplier tube, a dynode tap at a dynode of the photomultiplier can be electrically coupled to the amplifier 164. The dynode tap may be at a dynode closer to the anode as compared to the cathode of the photomultiplier tube. In a more particular embodiment, the dynode tap may be at a dynode that is 70 to 90% of the way from the cathode to the anode. For example, if a photomultiplier tube has 10 dynodes, the dynode tap may be at the $4^{th}$ dynode to the $10^{th}$ dynode from the cathode (the $10^{th}$ dynode from the cathode is the last dynode before the anode). After reading this specification, skilled artisans will understand that photomultiplier tubes may have more or fewer dynodes, and that the example is presented to improve understanding and not limit the invention in the appended claims.

The radiation sensing unit 140 may further include a temperature sensor 1406 that is electrically coupled to the control module 122. The temperature sensor 1406 may not be needed if (1) the photosensor 1424 has a linear temperature response or is substantially unaffected by a temperature change, (2) the radiation output from the controllable radiation source 1402 varies over its normal operating temperature range, or (3) any combination thereof. Alternatively, the control module 122 may include a look-up table that correlates temperature readings from the temperature sensor 1406 to a corresponding quantum efficiency for the photosensor 1424, a radiation emission intensity of the controllable radiation source 1402, or both.

The outputs from the photosensors 1424 and 1444 and, if present, from the temperature sensor 1406, provide signals to the control module 122. Amplifiers 162 and 164 can be used to amplify the signals from the photosensors 1424 and 1444. Inputs of the amplifiers 162 and 164 are electrically coupled to outputs of the photosensors 1424 and 1444, respectively, and the outputs of the amplifiers 162 and 164 are electrically coupled to inputs of the control module 122. In another embodiment (not illustrated), the amplifiers 162 and 164 may be within the control module 122.

The control logic 124 of the control module 122 can process the signals received from the radiation sensing unit 140 and produce control signals that may be used to control the voltage supplied by the voltage supply 180 to the photosensor 1444, control the gains of the amplifiers 164 and 166, or control both the voltage and the gains. In an embodiment in which the amplifier 166 is not used, the gain of the amplifier 164 is not controlled based on the signals from the radiation sensing unit 140. In another embodiment in which the amplifier 166 is present but its gain is not controlled based on the signals from the radiation sensing unit 140, the gain of the amplifier 164 is likewise not controlled based on the signals from the radiation sensing unit 140. In this particular embodiment can be set to a fixed value, and is not adjusted as part of the calibration sequence. The control signals from the control module 122 to the voltage supply 180 and the amplifier 164 are illustrated as dashed lines in FIG. 1.

Figure 2:
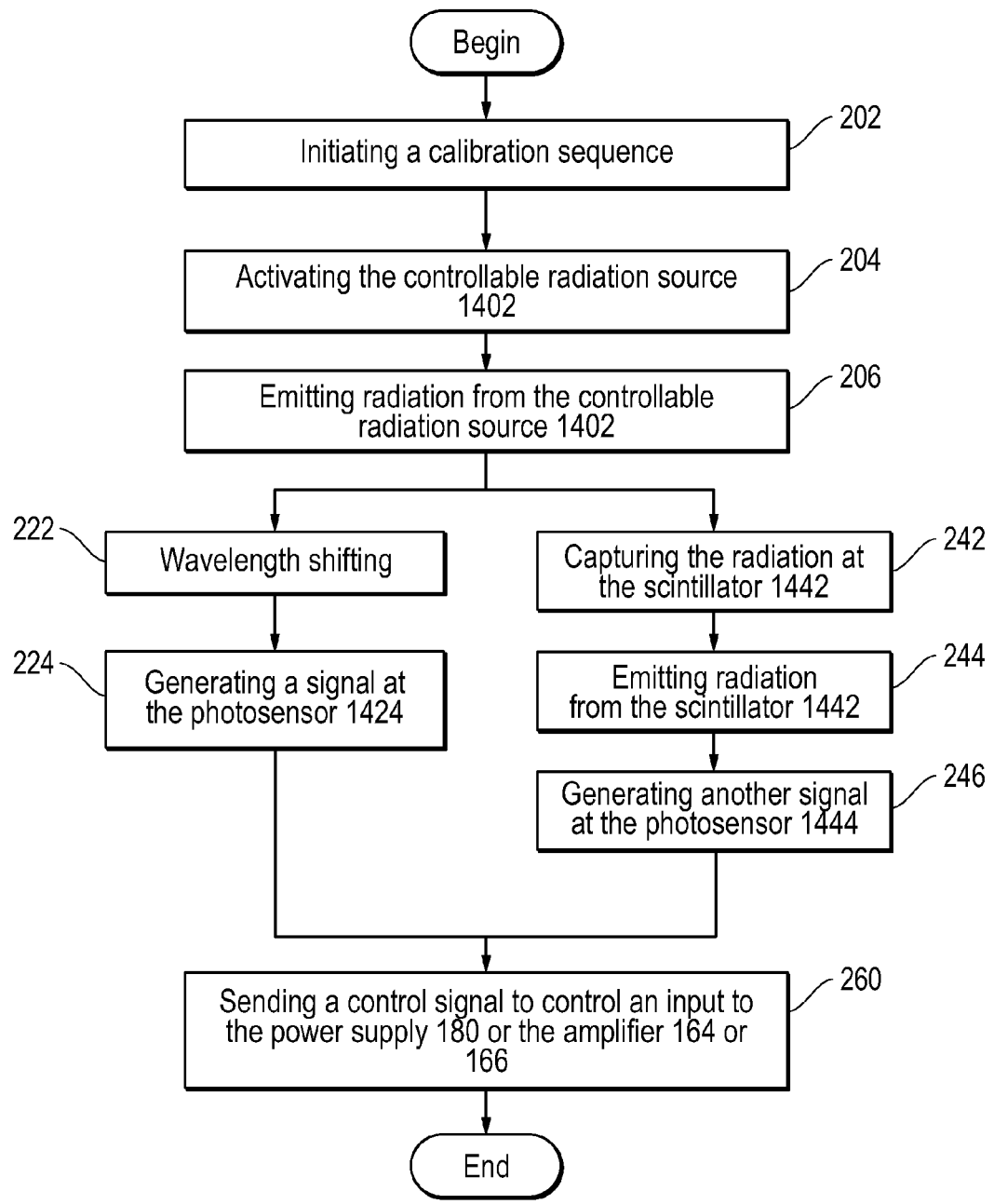
FIG. 2 includes a flow chart of a calibration sequence in accordance with an embodiment.

FIG. 2 includes a flow diagram of an exemplary, non-limiting method of using a radiation detection system. The method will be described with respect to the radiation detection system 10 to aid in understanding of the methods. Before beginning the method as described with respect to FIG. 2, the radiation detection system may be adjusted and have a baseline set. In a particular embodiment, the output of the radiation detection system 10 can be coupled to a multi-channel analyzer. The gain of the system can be adjusted such that radiation from a known radiation source has a peak at a particular channel. For example, the system can be adjusted so that $^{137}Cs$ has a peak at channel 662. Alternatively or in addition, the intensity of radiation emitted by the controllable radiation source 1442 can be adjusted to be outside the window of interest for the radiation that is to be detected by the system. Other adjustments or preparations may be performed if needed or desired. At this point for the particular embodiment, a baseline for the system is set, and the calibration sequence is ready to begin. Some or all of the calibration sequence can be performed without any human intervention.

The method can begin with initiating a calibration sequence, at block 202 in FIG. 2. The calibration sequence can be initiated by a user sending a calibration signal that is received as a calibration enable signal at the control module 122. The method further includes activating the controllable radiation source 1402, at block 204 in FIG. 2. The control module 122 can generate a signal to activate the controllable radiation source 1402. The signal from the control module 122 is received by the driver 130 that drives the controllable radiation source 1402.

The method can further include emitting radiation from the controllable radiation source 1402, at block 206. In a particular embodiment, the controllable radiation source 1402 is a UV LED and produces UV radiation when activated. Radiation from the controllable radiation source 1402 is directed towards the photosensor 1424 and the scintillator 1442. In a particular embodiment, the controllable radiation source 1402 produces radiation that is received by the optical piece 1404 and is directed towards both the scintillator 1442 and towards the photosensor 1424.

Referring to FIG. 2, the flowchart is split between operations that correspond to a path including the optional wavelength shifter 1422 and the photosensor 1424 (blocks 222 and 224), and another path including the scintillator 1442 and the photosensor 1444 (blocks 242, 244, and 246).

In an embodiment, the photosensor 1424 may not be significantly responsive to the radiation as emitted by the controllable radiation source 1402. Referring to block 222 in FIG. 2, the wavelength shifting material 1422 shifts the wavelength of the radiation as emitted by the controllable radiation source 1402 from its original wavelength as emitted to a different wavelength for which the photosensor 1424 is more responsive. In a particular embodiment, the controllable radiation source 1402 can emit UV radiation, and the wavelength shifting material 1422 may shift UV radiation into blue light or green light depending on the particular photosensor 1424 used. If the photosensor 1424 is adequately responsive to the radiation emitted by the controllable radiation source 1402 over the normal operating temperature range for the radiation detection system, then the wavelength shifting operation as illustrated at block 222 in FIG. 2 may be omitted. Referring to block 224 in FIG. 2, the method can further include generating a signal at the photosensor 1424 in response to receiving radiation from the controllable radiation source 1402 or radiation from the wavelength shifting material 1422 if the wavelength shifting operation (block 222) was performed. The photosensor 1424 generates electrons which form an electronic signal, such as an electronic pulse, that can be sent to the amplifier 162 and then to the control module 122.

Along the other branch of the flowchart in FIG. 2, the method can include capturing the radiation (emitted from the controllable radiation source 1402) at the scintillator 1442, at block 242. The method can further include emitting radiation from the scintillator 1442, at block 244. In a particular example, this scintillator 1442 may capture radiation, such as UV radiation from the controllable radiation source 1402 and emit scintillating light in response to capturing the UV radiation. The scintillating light may be at a wavelength within the visible light spectrum, such as blue light or green light. In another embodiment, the scintillating light may be at a wavelength outside the visible light spectrum. The photosensor 1444 may respond significantly more to the scintillating light from the scintillator 1442 than from the radiation emitted from the controllable radiation source 1402. A filter (not illustrated) may be disposed between the scintillator 1442 and the photosensor 1444. The filter can transmit through the emission spectrum of the scintillator but does not transmit at the wavelength of the controllable radiation source. In a particular embodiment, NaI starts its emission of light at approximately 310 nm. When the controllable radiation source 1402 is a UV LED emitting at 250 nm and the filter transmits at 300 but absorbs light at 250 nm, then the scintillator 1442 will be exposed to the UV, but the photosensor 1444 will only receive scintillating light. Although not illustrated in FIG. 1, a wavelength shifting material may be used to shift the wavelength of the scintillating light to a different wavelength if such shifting is needed or desired.

The method can include generating another signal at the photosensor 1444, at block 246 in FIG. 2. In an embodiment, the photosensor 1444 includes a photomultiplier coupled to the voltage supply 180, a dynode tap that is coupled to the control module 122, and the anode that provides an output to a user. In an embodiment in which the voltage supply 180 is coupled to the cathode, the voltage supply 180 can provide a negative voltage, and in another embodiment in which the voltage supply 180 is coupled to the anode, the voltage supply 180 can provide a positive voltage.

The dynode tap is used in this particular embodiment of the calibration sequence in order to reduce potential contamination or interference with the signal at the anode. Note that the presence of a dynode tap is not required, and if needed or desired, the output at the anode for the photosensor 1444 may be routed to the amplifier 164 as illustrated in FIG. 2. Further, if the photosensor 1444 includes a semiconductor-based photomultiplier, the anode of such photomultiplier may be coupled to the control module 122, although this is not illustrated in FIG. 2.

In the embodiment as illustrated in FIG. 1, the amplifiers 162 and 164 may be used to amplify the signals from the photosensors 1424 and 1444 before they reach the control module 122. Additional signal conditioning or processing may occur within the control module 122. For example, analog signals from the photosensors 1424 and 1444 may be converted to digital signals, and therefore the control module may have one or more digital-to-analog converters (not illustrated in FIG. 1). Additionally, the control module 122 may include a buffer (not illustrated in FIG. 1) to receive the signals from the photosensors 1424 and 1444 before the signals are directed to the control logic 124.

The control logic 124 may determine that the control signal to the voltage supply 180, the gain to the amplifier 164 or 166, or any combination thereof is to be changed. If such a condition occurs, the method can include sending a control signal to control an input to a power supply or an amplifier, at block 260 in FIG. 2. In an embodiment, the control logic 124 can include or access a look-up table that correlates signals from the amplifiers 162 and 164 and received by the control module 122 to voltages for the voltage supply 180 or gains for the amplifiers 164 and 166. The data in the look-up table may be based on empirical data that was collected when the radiation sensing unit 140 was previously exposed to an environment at known different temperatures. The known different temperatures can include temperatures within the normal operating temperature range and potentially a few additional temperatures outside the normal operating temperature range on either side or both sides of the normal operating temperature range. Based on the information in the look-up table, the control logic 124 can determine a voltage for the voltage supply 180 and send a control signal corresponding to voltage supply 180 to achieve the voltage or can determine gains for the amplifiers 164 or 166 and send a control signal corresponding to gains to the amplifiers 164 or 166. The control signal can be provided so that the output of radiation detection system 10 would appear to the user as not being significantly affected by the temperature of the radiation sensing unit 140.

In another embodiment, the radiation sensing unit 140 includes a temperature sensor 1406. If needed or desired, a signal from the temperature sensor 1406 may be used during part of the analysis. The temperature sensor 1406 may be useful if the photosensor 1424 is affected by temperature and does not have a linear temperature response.

The calibration sequence can be repeated. The control module 124 may include a timer or another component that will perform another calibration sequence at a predetermined time, a frequency, upon the occurrence of a predetermined event, or any combination thereof. After reading this specification, skilled artisans will be able to determine when the calibration sequence is to be repeated.

Embodiments as described herein can be used to account for changes in temperature as experienced by the radiation detection system 10, and in particular, the radiation sensing unit 140 may include a scintillator 1442 that is sensitive to temperature. Compare the radiation detection system described herein to the detector as described in U.S. Pat. No. 7,005,646, in which radiation from an LED is delivered through a scintillation crystal to the photosensitive part of the photomultiplier. The LED does not cause a significant amount of scintillation light to be emitted from the scintillator crystal. Thus, the detector in U.S. Pat. No. 7,005,646 does not properly account for temperature effects regarding scintillating light emitted by the scintillator crystal. A radiation detection system as previously described can be configured to provide an output signal at the output in response to the scintillator being exposed to a particular radiation flux, wherein the output signal is substantially temperature independent over a normal operating temperature range for the scintillator.

In another particular embodiment described herein, the photosensor 1424 may have a linear temperature response obviating the need for a separate temperature sensor. In U.S. Pat. No. 7,005,646, a temperature sensor and look-up table for the scintillator response are required. Thus, the detector in U.S. Pat. No. 7,005,646 would likely not be able to properly calibrate without a temperature sensor.

Another particular embodiment described herein can use a temperature sensor, even if the photosensor 1424 has a linear temperature response. The combination of such a photosensor and temperature sensor can be useful, particularly when the intensity of radiation emitted by the controllable radiation source 1402 degrades over time or is not properly operating. For example, if a reading from the photosensor 1424 does not properly correspond to a reading from the temperature sensor 1406, the radiation detection system 10 may have a problem with the controllable radiation source 1402.

In a further embodiment, the amplifier 166 and the gain control for the amplifier 164 may not be used. As previously discussed, an output signal from the radiation detection system 10 may be desired to be as close as possible to the signal from the anode of the photosensor 1444. In this particular embodiment, the amplifier 166 changes the amplification as well as the pulse shape of the signal from the anode. When the amplifier 166 is not present, the signal from the anode is not amplified and does not have spurious noise that may occur with amplification of a signal. Thus, when the amplifier 166 is not present, the output signal of the radiation detection system is closer to the signal from the anode as compared to when the signal from the anode is amplified. If the amplifier 166 is removed, control of the voltage supply 180 can be used to adjust for temperature changes of the radiation sensing unit 140 because the gain of amplifier 166 cannot be changed when the amplifier 166 is not present.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

In a first aspect, a radiation detection system can include a controllable radiation source configured to emit a first radiation, and a first photosensor coupled to controllable radiation source. The radiation detection system can also include a scintillator coupled to the controllable radiation source, and a second photosensor optically coupled to the scintillator. The radiation detection system can further include a control module coupled to the controllable radiation source and the first and second photosensors, wherein the control module is configured to control the controllable radiation source, and control a power supply coupled to the second photosensor in response to at least signals from the first and second photosensors, or control an amplifier coupled to an output of the second photosensor.

In an embodiment of the first aspect, the radiation detection system further includes a driver circuit configured to receive an activation signal from the control module and to drive the controllable radiation source. In another embodiment, the control module controls a voltage supplied to the second photosensor. In a particular embodiment, the radiation detection system further includes a voltage supply, wherein the control module is coupled to a control terminal of the voltage supply, and an output terminal of the voltage supply is coupled to an anode or a cathode of the second photosensor. In still another embodiment, the second photosensor includes a dynode tap, wherein the dynode tap is coupled to the control module. In a particular embodiment, the second photosensor includes an anode, wherein the anode is not coupled to the control module.

In a further embodiment of the first aspect, the scintillator is capable of capturing the first radiation having a first electromagnetic radiation spectrum and emitting a second radiation having a second electromagnetic radiation spectrum different from the first electromagnetic radiation spectrum in response to at least capturing the first radiation. In a particular embodiment, the second photosensor is responsive to the second radiation. In still a further embodiment, the control module is configured to control when a calibration operation is to be performed. In yet a further aspect, the control module is configured to control how frequently a calibration operation is to be performed.

In a second aspect, a radiation detection system can include a controllable radiation source configured to emit a first radiation, a scintillator, and a photomultiplier tube optically coupled to the scintillator, wherein the photomultiplier tube includes a dynode tap. The radiation detection system can also include a control module coupled to the controllable radiation source and the photomultiplier tube, wherein the control module is configured to control the controllable radiation source and control an input to or an output from the photomultiplier tube in response to at least a signal from the dynode tap of the photomultiplier tube.

In a third aspect, a radiation sensing unit can include a controllable radiation source configured to emit a first radiation having a first electromagnetic radiation spectrum, and a first photosensor coupled to the controllable radiation source. The radiation sensing unit can further include a scintillator and a second photosensor. The scintillator can be coupled to the controllable radiation source, wherein the scintillator is capable of capturing the first radiation and emitting a second radiation in response to at least capturing the first radiation, wherein the second radiation has a second electromagnetic radiation spectrum different from the first radiation electromagnetic spectrum. The second photosensor can be optically coupled to the scintillator, wherein the second photosensor is responsive to the second radiation.

In a fourth aspect, a radiation detection system can include a scintillator capable of capturing the first radiation and emitting a second radiation in response to at least capturing the first radiation, a photosensor optically coupled to the scintillator, wherein the second photosensor is responsive to the second radiation, and an output coupled to the photosensor. The radiation detection system can be configured to provide an output signal at the output in response to at least the scintillator being exposed to a particular radiation flux, wherein the output signal is substantially temperature independent over a normal operating temperature range for the scintillator.

In an embodiment of the fourth aspect, the output signal is substantially temperature independent over a normal operating temperature range for the photosensor. In a particular embodiment, no temperature sensor is adjacent to the scintillator or the photosensor.

In a fifth aspect, a method of using a radiation detection system can include emitting a first radiation having a first electromagnetic radiation spectrum from a controllable radiation source towards a scintillator and a first photosensor and generating a first signal at the first photosensor after the first radiation is emitted from the controllable radiation source. The method can also include capturing the first radiation at a scintillator, emitting a second radiation from the scintillator, wherein the second radiation has a second electromagnetic radiation spectrum different from the first electromagnetic radiation spectrum, and generating a second signal at the second photosensor in response to at least receiving the second radiation. The method can further include sending a first control signal in response to at least receiving the first and second signals, wherein the first control includes control of an input to a power supply coupled to the second photosensor or control of an amplifier coupled to the second photosensor.

In an embodiment of the fifth aspect, the method further includes shifting the first radiation having an emission maximum at a first wavelength to a third radiation having an emission maximum at a second wavelength different from the first wavelength. In another embodiment, the method further includes initiating a calibration sequence in response to at least receiving user input. In a particular embodiment, the method further includes receiving an anode signal from an anode of the second photosensor and determining that a radiation event occurred during the calibration sequence. In a more particular embodiment, determining that the radiation event occurred during the calibration sequence includes removing a calibration portion from the anode signal. In any of the preceding embodiments of the fifth aspect the method further includes activating the controllable radiation source. In any of the preceding embodiments of the fifth aspect, the method further includes sending the first photosensor, the scintillator, and the second photosensor down a well bore.

In any of the preceding embodiments of any of the preceding aspects, the controllable radiation source is a UV LED. In a more particular embodiment, the first radiation is UV radiation. In any of the preceding embodiments of any of the preceding aspects, the first photosensor is significantly responsive to UV radiation. In any of the preceding embodiments of any of the preceding aspects, a wavelength shifter can be disposed between and coupled to the controllable radiation source and the first photosensor. In a more particular embodiment, the first photosensor is significantly responsive to blue light or green light. In any of the preceding embodiments of any of the preceding aspects, the first photosensor includes a photodiode. In any of the preceding embodiments of any of the preceding aspects, the second radiation includes scintillating light. In a more particular embodiment, the scintillating light is substantially blue light or green light.

In any of the preceding embodiments of any of the preceding aspects, the second photosensor is not significantly responsive to the first radiation. In any of the preceding embodiments of any of the preceding aspects, the second photosensor includes a photomultiplier. In a particular embodiment, the photomultiplier includes a photomultiplier tube or a semiconductor-based photomultiplier. In any of the preceding embodiments of any of the preceding aspects, a temperature sensor can be disposed adjacent to the first or second photosensors. In any of the preceding embodiments of any of the preceding aspects, no temperature sensor is adjacent to the first photo sensor or the second photosensor. In any of the preceding embodiments of any of the preceding aspects, wherein the scintillator includes a rare earth or other metal halide; a rare earth sulfide, oxysulfide, germinate, silicate, or aluminum garnet; a $CdWO_4$, a $CaWO_4$, a ZnS, a ZnO, a ZnCdS; or any combination thereof. In a particular embodiment, the scintillator comprises a NaI, a CsI, a BGO, a$SrI_2$, a $LaBr_3$, a LYSO, a LSO, or any combination thereof.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detection system comprising:
    a controllable radiation source configured to emit a first radiation having a first radiation electromagnetic spectrum;
    a scintillator coupled to the controllable radiation source and configured to emit a second radiation, wherein the second radiation has a second electromagnetic radiation spectrum different from the first radiation electromagnetic spectrum;
    a first photosensor coupled to the controllable radiation source, wherein the first photosensor is more responsive to the first radiation as compared to the second radiation;
    a second photosensor optically coupled to the scintillator, wherein the second photosensor is more responsive to the second radiation as compared to the first radiation; and
    a control module coupled to the controllable radiation source and the first and second photosensors, wherein the control module is configured to:
        control the controllable radiation source; and
        control a power supply coupled to the second photosensor in response to at least signals from the first and second photosensors, or control an amplifier coupled to an output of the second photosensor.

2. The radiation detection system of claim 1, further comprising a driver circuit configured to receive an activation signal from the control module and to drive the controllable radiation source.

3. The radiation detection system of claim 1, wherein the control module controls a voltage supplied to the second photosensor.

4. The radiation detection system of claim 3, further comprising a voltage supply, wherein the control module is coupled to a control terminal of the voltage supply, and an output terminal of the voltage supply is coupled to an anode or a cathode of the second photosensor.

5. The radiation detection system of claim 1, wherein the second photosensor comprises a dynode tap, wherein the dynode tap is coupled to the control module.

6. The radiation detection system of claim 5, wherein the second photosensor comprises an anode, wherein the anode is not coupled to the control module.

7. The radiation detection system of claim 1, wherein the scintillator is capable of capturing the first radiation having a first electromagnetic radiation spectrum and emitting a second radiation having a second electromagnetic radiation spectrum different from the first electromagnetic radiation spectrum in response to at least capturing the first radiation.

8. The radiation detection system of claim 7, wherein the second photosensor is responsive to the second radiation.

9. The radiation detection system of claim 1, wherein the control module is configured to control when a calibration operation is to be performed.

10. The radiation detection system of claim 1, wherein the control module is configured to control how frequently a calibration operation is to be performed.

11. The radiation detection system of claim 1, wherein the first photosensor is significantly responsive to UV radiation.

12. The radiation detection system of claim 1, further comprising a temperature sensor adjacent to the first photosensor or the second photosensor.

13. The radiation detection system of claim 1, wherein no temperature sensor is adjacent to the first photosensor, the scintillator, or the second photosensor.

14. The radiation detection system of claim 1, wherein the first radiation is ultraviolet radiation.

15. The radiation detection system of claim 14, wherein the second radiation is blue light or green light.

16. A method of using a radiation detection system comprising:
    emitting a first radiation having a first electromagnetic radiation spectrum from a controllable radiation source towards a scintillator and a first photosensor;
    generating a first signal at the first photosensor after the first radiation is emitted from the controllable radiation source;
    capturing the first radiation at the scintillator;
    emitting a second radiation from the scintillator in response to capturing the first radiation, wherein the second radiation has a second electromagnetic radiation spectrum different from the first electromagnetic radiation spectrum;
    generating a second signal at a second photosensor in response to at least receiving the second radiation; and
    sending a first control signal in response to at least receiving the first and second signals, wherein the first control includes:
        control of an input to a power supply coupled to the second photosensor; or
        control of an amplifier coupled to the second photosensor,
    wherein emitting the first radiation, capturing the first radiation, emitting the second radiation, and generating the second signal are performed as part of a calibration sequence.

17. The method of claim 16, further comprising:
    initiating a calibration sequence in response to at least receiving user input;
    receiving an anode signal from an anode of the second photosensor; and
    determining that a radiation event occurred during the calibration sequence.

18. The method of claim 17, wherein determining that the radiation event occurred during the calibration sequence comprises removing a calibration portion from the anode signal.

19. The method of claim 16, wherein the second photosensor is more responsive to the second radiation as compared to the first radiation.

20. A radiation sensing unit comprising:
    a controllable radiation source configured to emit a first radiation, wherein the first radiation is ultraviolet radiation;
    a first photosensor coupled to the controllable radiation source;
    a wavelength shifter disposed between and coupled to the controllable radiation source and the first photosensor;
    a scintillator coupled to the controllable radiation source, wherein the scintillator is capable of capturing the first radiation and emitting a second radiation in response to at least capturing the first radiation, wherein the second radiation is blue light or green light; and
    a second photosensor optically coupled to the scintillator, wherein the second photosensor is responsive to the second radiation.

* * * * *